(12) United States Patent
Yagi et al.

(10) Patent No.: US 7,095,089 B2
(45) Date of Patent: Aug. 22, 2006

(54) LIGHT DETECTING DEVICE AND METHOD FOR MOUNTING THE SAME

(75) Inventors: Shigeru Yagi, Minamiashigara (JP); Hiroshi Kojima, Minamiashigara (JP); Shigeru Kurita, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/817,939

(22) Filed: Apr. 6, 2004

(65) Prior Publication Data
US 2004/0200976 A1    Oct. 14, 2004

(30) Foreign Application Priority Data
Apr. 8, 2003    (JP)    ............... 2003-104474

(51) Int. Cl.
  *H01L 31/0203* (2006.01)
(52) U.S. Cl. .............. 257/433; 257/431; 257/432; 257/434; 257/435
(58) Field of Classification Search ........ 257/431–434, 257/436, 444, 451, 500, 617, 72
See application file for complete search history.

(56) References Cited

U.S. PATENT DOCUMENTS

| | | | | |
|---|---|---|---|---|
| 4,811,069 A | * | 3/1989 | Kakinuma et al. | 257/54 |
| 5,155,612 A | * | 10/1992 | Adachi et al. | 349/111 |
| 5,243,260 A | * | 9/1993 | Vinouze et al. | 315/169.1 |
| 6,300,159 B1 | * | 10/2001 | Mochizuki | 438/67 |
| 6,639,705 B1 | * | 10/2003 | Hira | 359/237 |
| 6,737,677 B1 | * | 5/2004 | Shimoida et al. | 257/77 |

FOREIGN PATENT DOCUMENTS

JP        A 2001-210856        8/2001

* cited by examiner

*Primary Examiner*—Wai-Sing Louie
(74) *Attorney, Agent, or Firm*—Oliff & Berridge, PLC

(57) ABSTRACT

A light detecting device is fabricated to have the following structure: a light receiving element having a protective layer, in which a transparent conductive electrode, a semiconductor layer, an electrode and the protective layer are successively formed on a transparent substrate, is arranged on a first face of an insulating substrate having a terminal electrode formed to be exposed to first and second faces of the insulating substrate in such a manner that the protective layer is opposed to the first face of the insulating substrate; and further the transparent conductive electrode and the electrode are connected electrically to the terminal electrode exposed to the first face of the insulating substrate. The light detecting device having this structure is surface-mounted on a circuit board to connect the terminal electrode exposed to the second face of the insulating substrate to an external terminal of the circuit board.

24 Claims, 6 Drawing Sheets

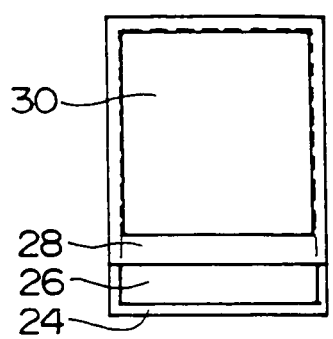
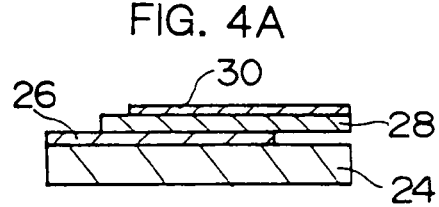
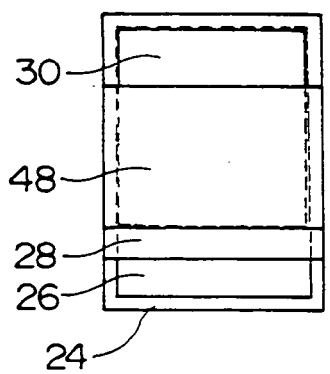
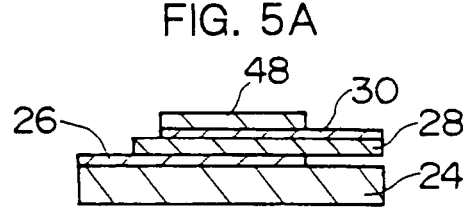

LIGHT DETECTING DEVICE AND METHOD FOR MOUNTING THE SAME

CROSS-REFERENCE TO RELATED APPLICATION

This application claims priority under 35USC 119 from Japanese Patent Application No. 2003-104474, the disclosure of which is incorporated by reference herein.

BACKGROUND OF THE INVENTION

1. Field of the Invention

The present invention relates to a light detecting device such as an ultraviolet ray detecting device.

2. Description of the Related Art

In recent years, industrial instruments using ultraviolet rays have been spread in many devices such as color image outputting devices, ozone generating devices and semiconductor fabricating devices, and many fields such as printing, painting and optical shaping fields. In order to measure ultraviolet rays, a semiconductor light receiving element is used.

As the semiconductor light receiving element, an element made of a semiconductor which absorbs no visible light, such as an element made of a gallium nitride type semiconductor or an oxide type semiconductor, is suggested. About the nitride type semiconductor, an ultraviolet ray receiving element made of polycrystal gallium nitride and formed on a transparent conductive glass substrate has been made practicable. Generally, when semiconductor elements, which are initially fabricated as semiconductor chips, are used as light receiving elements, the semiconductor elements are integrated into a plastic or ceramic package, or a protective layer is formed on the elements.

These light receiving elements have, as output terminals from the elements, pins made of a metal line or plate-form terminal electrodes, and the output terminals are used to mount the light receiving elements on a circuit or an amplifier. Thus, under the present situation, surface mounting technique cannot be applied to these light receiving elements.

For example, Japanese Patent Application Laid-Open (JP-A) No. 2001-210856 proposes a thin ultraviolet ray detecting device in which a light receiving element is fixed onto a protecting member with an epoxy adhesive agent. However, as its output terminals, terminals having lines or rod-like electrodes are used. Thus, surface mounting technique cannot be applied to the detecting device.

In order to use a greater number of these light receiving elements in automatic machines as electronic instruments have been made smaller in recent years, it has been desired that the light receiving elements are in an element form which can cope with surface mounting technique. Improvement for attaining such a desire has been expected.

Accordingly, the invention overcomes the above-mentioned problems in the prior art and attains the following object. That is, an object of the invention is to provide a light detecting device which can stably be surface-mounted on, for example, a circuit board. Another object of the invention is to provide a method for mounting the same.

SUMMARY OF THE INVENTION

In order to solve the above-mentioned problems, the light detecting device of the present invention comprises: a light receiving element comprising a semiconductor layer for detecting light, and a first electrode connected electrically to the semiconductor layer; an insulating substrate on which the light receiving element is arranged; a second electrode provided so as to be exposed at a first face and a second face of the insulating substrate; and a protective layer provided between the light receiving element and the insulating substrate, wherein the light receiving element is arranged on the first face of the insulating substrate, and the first electrode is electrically connected to the second electrode which is exposed at the first face of the insulating substrate.

In the light detecting device of the invention, the light receiving element is arranged on the first face of the insulating substrate and further the second electrode exposed to the first face (for example, the front surface) of the insulating substrate is connected electrically to the semiconductor layer of the light receiving element through the first electrode. When the light detecting device is mounted on, for example, a circuit board, the second electrode exposed to the second face (for example, an end face (side face) or the rear surface) of the insulating substrate is connected electrically to an external terminal of the circuit board. Furthermore, the protective layer may be formed between the light receiving element and the insulating substrate. Therefore, when the light detecting device is worked or mounted, the mechanical strength and the chemical stability (against, for example, heat treatment at the time of the mounting) of the light receiving element can be maintained. For this reason, the light detecting device, which has a simple structure, can be stably surface-mounted on the circuit board or the like without changing the structure of the light receiving element to a large degree.

In the light detecting device of the invention, it is preferable that each of the first electrode and the second electrode is made of at least one pair of electrodes since two electric connections are usually taken from a single semiconductor layer.

In the light detecting device of the invention, it is preferable that the second electrode is a metallic electrode. In this way, the second electrode is made up to the metallic electrode, whereby solder can be used when the light detecting device is electrically connected to, for example, the external terminal of a circuit board. Consequently, more effective surface mounting can be attained.

In the light detecting device of the invention, it is preferable that the insulating substrate absorbs visible light. The absorption of visible light by the insulating substrate makes it possible to prevent the matter that the light transmitted through the semiconductor layer of the light receiving element is reflected on the insulating substrate so as to be again radiated onto the semiconductor layer. As a result, precise light detection can be attained.

In the light detecting device of the invention, an example of the structure of the light receiving element is a structure in which the semiconductor layer and the first electrode are formed on a transparent substrate. Moreover, by forming a light-shielding layer on an end face (side face) of the transparent substrate, it is possible to prevent the incidence of light from the end face of the transparent substrate into the light detecting device and improve the light incidence angle characteristic of the device.

In the light detecting device of the invention, it is preferable that the semiconductor layer of the light receiving element is made of a nitride comprising nitrogen and at least one element selected from Al, Ga and In. The light receiving element made of this nitride type semiconductor can be made as a small and thin ultraviolet ray receiving element.

In the light detecting device of the invention, it is preferable that the protective layer transmits visible light. From the viewpoints of workability and heat resistance, it is also preferable that the protective layer is made to comprise a silicone resin. In this case, the light detecting device favorably has a high heat resistance.

In the light detecting device of the invention, it is preferable that a visible light absorbing layer is formed between the light receiving element and the insulating substrate. The formation of this visible light absorbing layer makes it possible to prevent the matter that the light transmitted through the semiconductor layer of the light receiving element is reflected on the insulating substrate so as to be again radiated onto the semiconductor layer. As a result, precise light detection can be attained.

From the viewpoints of workability and heat resistance, it is also preferable that the visible light absorbing layer is made to comprise a silicone resin. In this case, the light detecting device favorably has a high heat resistance.

In the light detecting device of the invention, it is preferable that the first electrode of the light receiving element and the second electrode of the insulating substrate are electrically connected to each other through an electrically conductive member at a position different from a light receiving portion of the light receiving element and further bonded to each other, thereby fixing the light receiving element onto the insulating substrate. It is also preferable that this electrically conductive member is made of an electrically conductive resin.

The light receiving element and the insulating substrate may be bonded and fixed to each other by applying an adhesive agent onto the entire surface of the light receiving element (except for electrodes for connecting the light receiving element). However, the adhesive agent, a typical example of which is an epoxy adhesive agent, is unstable against ultraviolet rays in many cases. The above-mentioned JP-A No. 2001-210856 makes a suggestion for preventing a deterioration of an epoxy adhesive agent used to bond a light receiving element and a protective member to each other by absorption of ultraviolet rays by a semiconductor layer. However, the absorption by the semiconductor layer is incomplete and this layer transmits the ultraviolet rays. Therefore, a problem about endurance of the adhesive agent remains. Thus, in the invention, the first electrode of the light receiving element and the second electrode of the insulating substrate are electrically connected and bonded to each other through the electrically conductive member at the position different from the light receiving portion of the light receiving element, whereby the light receiving element is bonded and fixed to the insulating substrate and ultraviolet rays transmitted from the light receiving portion which the semiconductor layer constitutes are not radiated onto the bonding portion (the electrically conductive member). As a result, deterioration thereof by the ultraviolet rays can be prevented.

In the invention, the following structure is a preferable: the second electrode is formed to be exposed to the front and rear surfaces of the insulating substrate, the light receiving element is arranged on the front surface of the insulating substrate, and further the first electrode is electrically connected to the second electrode exposed to the front face of the insulating substrate.

The method for mounting a light detecting device on a circuit board of the invention is a method of surface-mounting the above-mentioned semiconductor device of the invention on the circuit board in such a manner that the second electrode exposed to the second face of the insulating substrate is connected to an external terminal of the circuit board. Accordingly, stable surface mounting can be attained as described above.

BRIEF DESCRIPTION OF THE DRAWINGS

FIG. 4A is a sectional view for explaining the process for producing the light receiving element of the light detecting device according to the embodiment of the invention.

FIG. 4B is a plan view for explaining the process for producing the light receiving element of the light detecting device according to the embodiment of the invention.

FIG. 5A is a sectional view for explaining the process for producing the light receiving element of the light detecting device according to the embodiment of the invention.

FIG. 5B is a plan view for explaining the process for producing the light receiving element of the light detecting device according to the embodiment of the invention.

DETAILED DESCRIPTION OF THE INVENTION

Figure 1A:
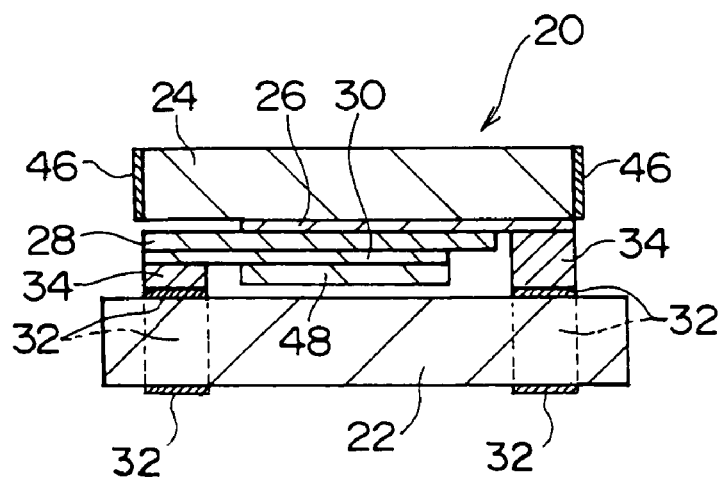
FIG. 1A is a sectional view illustrating a light detecting device according to an embodiment of the present invention.

An embodiment of the present invention is described with reference of the attached drawings hereinafter. In all of the drawings, the same reference numeral is attached to members having substantially the same function. In this manner, the members are described. Repeated descriptions are omitted.

Figure 1B:
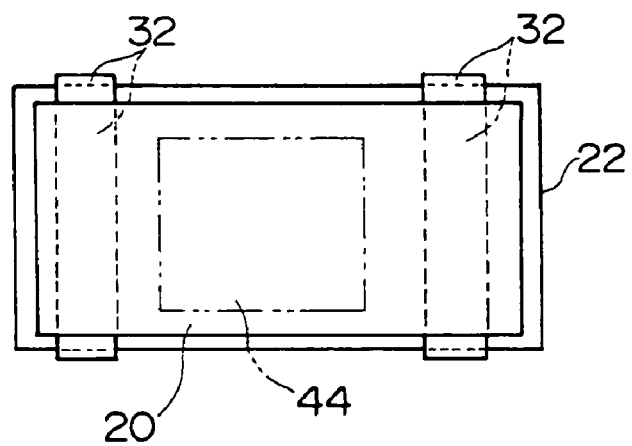
FIG. 1B is a plan view illustrating the light detecting device according to the embodiment of the invention.

FIGS. 1A and 1B are schematic views illustrating the structure of a light detecting device according to an embodiment of the invention. FIG. 1A is a section view thereof and FIG. 1B is a plan view thereof.

The light detecting device of the present embodiment has a structure in which a light receiving element 20 is arranged on an insulating substrate 22. In the present embodiment, the single light receiving element 20 is arranged on the single insulating substrate 22. However, plural light receiving elements 20 may be arranged into an array form or a laminate form on a single insulating substrate. Reference number 44 represents a light receiving portion.

Figure 2B:
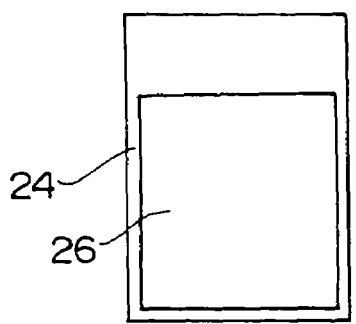
FIG. 2B is a plan view for explaining the process for producing the light receiving element of the light detecting device according to the embodiment of the invention.
Figure 2A:
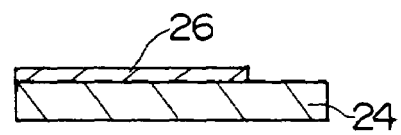
FIG. 2A is a sectional view for explaining a process for producing a light receiving element of the light detecting device according to the embodiment of the invention.
Figure 3B:
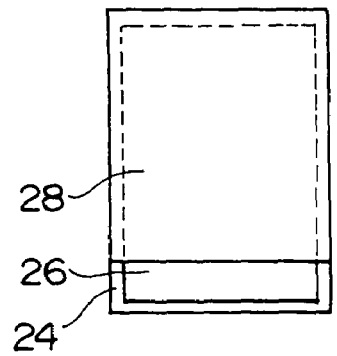
FIG. 3B is a plan view for explaining the process for producing the light receiving element of the light detecting device according to the embodiment of the invention.
Figure 3A:
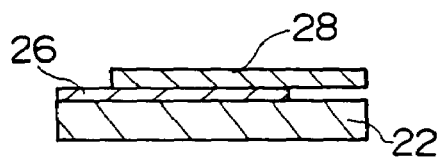
FIG. 3A is a sectional view for explaining the process for producing the light receiving element of the light detecting device according to the embodiment of the invention.

The light receiving element 20 has a structure obtained by forming a transparent conductive electrode (a first electrode) 26 on a transparent substrate 24 having end faces on which a light-shielding layer 46 is deposited (see FIGS. 2A and 2B), forming a semiconductor layer 28 on the transparent conductive electrode 26 (see FIGS. 3A and 3B), and then forming an electrode (another first electrode) 30 on the semiconductor layer 28 (see FIGS. 4A and 4B). The light receiving element 20 is produced as a light receiving element having a protective layer 48 by forming the protective layer 48 on the electrode 30 (see FIGS. 5A and 5B).

Terminal electrodes (second electrodes) 32 are formed on the insulating substrate 22 to extend from the front surface (first face) of the substrate 22 via end faces thereof to the rear surface (second face) thereof. Each of the terminal electrodes 32 may have any structure making it possible to be connected to the electrode (first electrode) of the light receiving element and to external terminals of a circuit board or the like when the present light detecting device is mounted on the circuit board or the like. It is sufficient that the terminal electrode 32 is formed to be exposed to the first face on which the light receiving element is arranged and to the second face which is different from the first face. For example, the terminal electrode 32 may be arranged to extend from the front surface of the insulating substrate 22 to one out of end faces thereof (in this form, this end face corresponds to the second face), or may be formed as follows: a through hole is made in the insulating substrate 22, and then an electrically conductive material is embedded in the through hole, so as to be exposed to the front and rear surfaces of the insulating substrate. The terminal electrode 32, which is exposed to the second face different from the first face of the insulating substrate 22, becomes an output terminal of the light detecting device.

The light receiving element 20 having the protective layer 48 is arranged toward the front surface of the insulating substrate 22 so that the side, of the light receiving element 20, having the protective layer formed thereon opposes the front surface. The transparent conductive electrodes 26 and 30 of the light receiving element 20 are electrically connected to the terminal electrodes exposed at the front surface (first face) of the insulating substrate through electrically conductive members 34.

In the light receiving element 20, the transparent conductive electrode 26 and the electrode 30 are electrically connected and bonded to the terminal electrodes 32 of the insulating substrate 22 through the electrically conductive members 34 at positions different from the light receiving portion 44, thereby fixing the light receiving element 20 onto the insulating substrate 22. For this reason, ultraviolet rays transmitted from the light receiving portion 44 which the semiconductor layer 28 constitutes are not radiated so that deterioration based on the ultraviolet rays can be prevented.

Figure 6A:
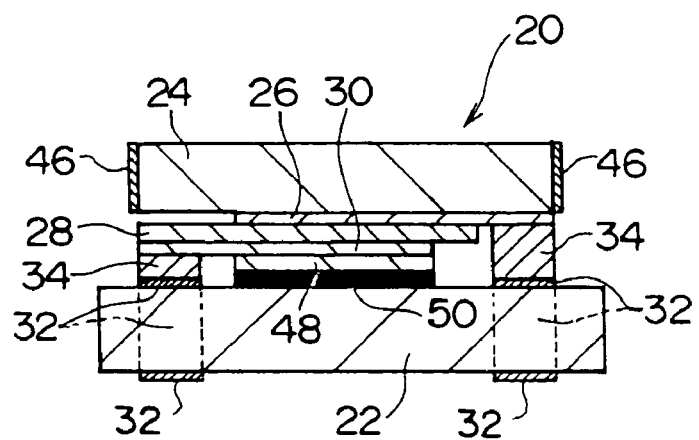
FIG. 6A is a sectional view illustrating another example of the light detecting device according to the embodiment of the invention.
Figure 6B:
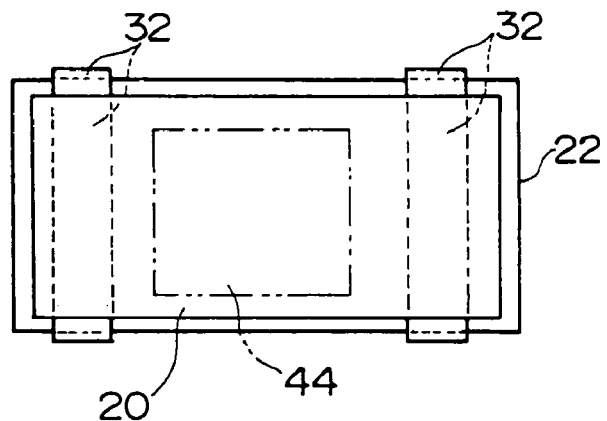
FIG. 6B is a plan view illustrating the another example of the light detecting device according to the embodiment of the invention.

As illustrated in FIGS. 6A and 6B, the light detecting device may have a structure in which a visible light absorbing layer 50 is formed between the light receiving element 20 and the insulating substrate 22. This visible light absorbing layer 50 may be formed on the protective layer 48 in advance or formed on the insulating substrate 22.

This visible light absorbing layer 50 absorbs light transmitted through the light receiving portion to prevent the matter that such light is reflected on the insulating substrate and again radiated onto the semiconductor layer. Consequently, precise light detection can be attained.

The light detecting device may be an embodiment in which a concave portion is made in the insulating substrate 22 and the light receiving element 20 is embedded in the concave portion. In this way, incidence of light from end faces of the light receiving element 22 to this element can be prevented. Thus, light detection can be appropriately carried out.

Figure 7:
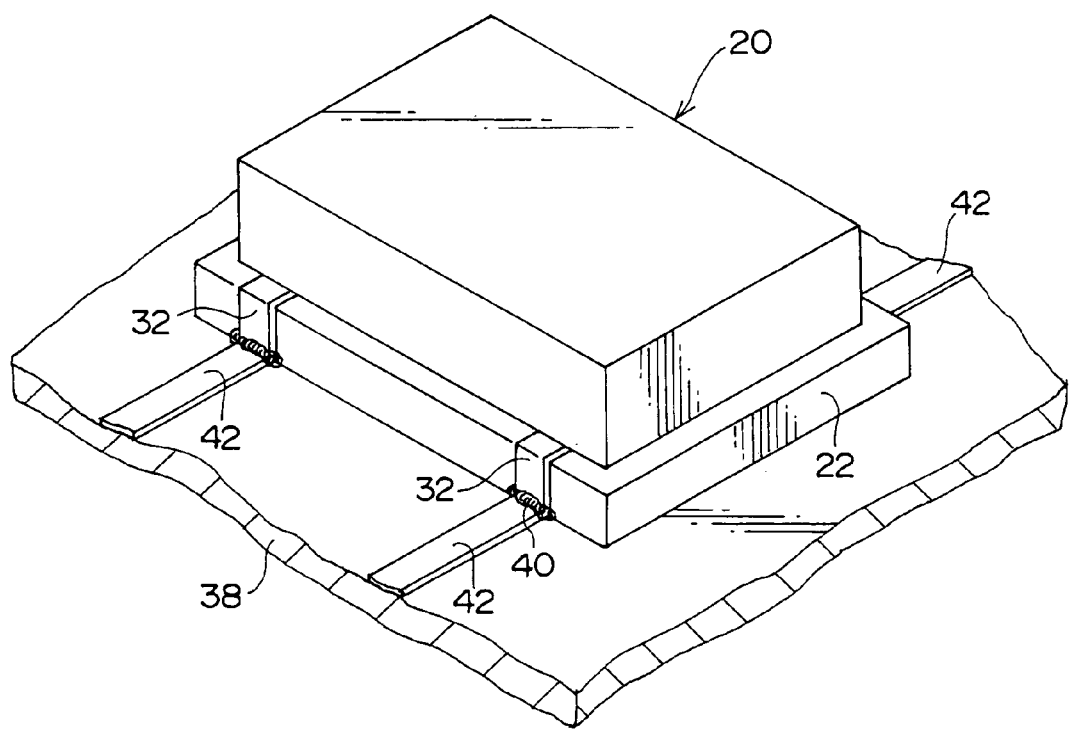
FIG. 7 is a view for explaining a method for mounting a light detecting device according to the embodiment of the invention.

As illustrated in FIG. 7, the light detecting device having the above-mentioned structure is positioned in such a manner that external terminals 42 having thereon printed creamy solders 40, on the circuit board 38, are electrically connected to the terminal electrodes 32 exposed to the rear surface (second face) of the insulating substrate 22, and then the resultant is subjected to, for example, reflow treatment, thereby surface-mounting the light detecting device on the circuit board.

In order to gain electric contact between the circuit board 38 and the light detecting device, it is preferable to use the solders. However, it is preferable from the viewpoints of bonding strength, heat resistance and environmental stability to use curable electrically conductive resin. As a conductant agent of the curable electrically conductive resin, filler made of metal or carbon can be used. As the resin of the curable electrically conductive resin, any resin that is usually used as adhesive agent material can be used. As the curable electrically conductive resin, an ordinary silver/epoxy type electrically conductive resin in which silver particles are dispersed can be used. As the curable electrically conductive resin, anisotropically conductive material also can be used.

As described above, in the present embodiment, the protective layer 48 is formed between the light receiving element 20 and the insulating substrate 22, whereby the mechanical strength and the chemical stability (against, for example, heat treatment in the mounting) of the light receiving element 20 can be maintained at the time of working or mounting the light detecting device. Simultaneously, the light detecting device, which has a simple structure, can be stably surface-mounted on a circuit board or the like without changing the structure of the light receiving element to a large degree. Since a specific nitride semiconductor is used for the semiconductor layer 28 in the light detecting device of the present embodiment, its light receiving element is a thin and small light receiving element having heat resistance. Therefore, the step of reflowing solder can be adopted for the electronic circuit board. Thus, the present light detecting device is a light detecting device which is particularly good in mass-productivity.

Each of the members in the light detecting device of the present embodiment is described in more detail hereinafter.

The insulating substrate 22 may be any substrate having electric non-conductance, and needs to have a heat resistance against heat of 100° C. or more temperature. The insulating substrate 22 may be transparent, opaque, or colored. Specifically, the insulating substrate 22 is preferably made of glass, an oxide ceramic, a nitride ceramic, a crystalline material such as sapphire or crystallized quartz, or a plastic such as an organic polymer resin or a mixture thereof with an inorganic material. Among these examples, the ceramic or plastic is preferable from the viewpoints of workability or availability.

The constituent material of the terminal electrodes 32 may be a metal or an electrically conductive oxide. The terminal electrodes 32 exposed to the end face (second face) of the insulating substrate are electrically connected to external terminals of a circuit board in the step of surface-mounting the light detecting device; therefore, the terminal electrodes 32 are generally made of a solder-matching electrically conductive material which is usually used as connecting material, and are preferably made of metal. However, when curable electrically conductive resin is used as the connecting member in the surface mounting step, the terminal electrodes 32 may be made of an electrically conductive material which cannot be bonded with solder, such as electrically conductive oxide.

The terminal electrodes 32 can be formed on the insulating substrate 22 by plating, vapor-depositing or sputtering, for example, Au, Ag, Ni, Pd, Pt, Al, Cu or alloy or heating and firing a paste composed of an organic polymer compound and a metal. The terminal electrodes 32 may be formed by bonding a thin metal plate onto the surface of the insulating substrate 22.

The semiconductor layer 28 of the light receiving element is preferably made of a nitride comprising nitrogen and at least one element selected from Al, Ga and In. The light receiving element made of such a nitride semiconductor can be formed as a small and thin ultraviolet ray receiving element. This nitride semiconductor is preferred since the light wavelength which the semiconductor can receive can be changed at will by changing the composition thereof.

The crystallinity of the nitride semiconductor is not particularly limited. The nitride semiconductor may be amorphous, may be in a microcrystal phase, may be in a mixed state of a microcrystal phase and an amorphous phase, may be a polycrystal, or may be a monocrystal. The crystal system thereof may be a cubic or hexagonal system, or may be in the state that plural crystal systems are mixed. The size of the microcrystal is from 5 nm to 5 $\mu$m, and can be measured by X-ray diffractometry, electron beam diffractometry, or shape analysis using an electron microscopic photograph. The semiconductor may be a semiconductor grown into a columnar form; a semiconductor which has a single peak in the X ray diffraction spectrum thereof and is in the form of a film in which the crystal plane direction thereof is highly oriented; or a monocrystalline semiconductor.

When the nitride semiconductor is not monocrystal, the semiconductor may be a semiconductor containing 0.5 to 50 at % (inclusive) of hydrogen, or a semiconductor containing a mono-coordinated halogen element.

If the concentration of hydrogen contained in the nitride semiconductor is less than 0.5 at %, this concentration is insufficient for removing bonding defects in crystal grain boundaries of the semiconductor or bonding defects and non-bonding hands inside the amorphous phase of the semiconductor by means of bonds to hydrogen and thus inactivating defect levels generated in the band. Consequently, bonding defects or structural defects increase and the dark resistance of the semiconductor lowers so that the photo-sensitivity thereof is lost. Thus, the semiconductor may not function as a practical photoconductor.

On the other hand, if the concentration of hydrogen contained in the nitride semiconductor is more than 50 at %, a probability that hydrogen is bonded to two or more out of III group elements and V group elements increases so that these elements form a two-dimensional or chain-form network without keeping any three-dimensional structure. In particular, in crystal grain boundaries, a great number of voids are generated. Consequently, a new energy level is generated in the band, so that the electric characteristics of the semiconductor may deteriorate and mechanical properties thereof, such as the hardness thereof, may lower. Additionally, the film is easily oxidized so that a large amount of impurity defects are generated in the film. As a result, good photoelectric characteristics may not be obtained.

If the concentration of hydrogen contained in the nitride semiconductor is more than 50 at %, hydrogen inactivates a dopant with which the semiconductor is doped in order to control the electric characteristics so that an electrically-active non-monocrystal photo-semiconductor made of amorphous material or microcrystal grains may not be obtained.

About the concentration of hydrogen, the absolute value thereof can be measured by hydrogen forward scattering (HFS). The concentration can be estimated by measuring the amount of hydrogen released by heat or by measuring the IR spectrum of the semiconductor. The state of the hydrogen bonds can be easily measured by the IR spectrum.

The ratio of the number of atoms of the III the group element to that of nitrogen atoms, the atoms being contained in the nitride semiconductor, is preferably from 0.5/1.0 to 1/0.5. If this atom number ratio is 0.5/1.0 or less or 1/0.5 or more, tetrahydral portions get fewer in the bonds between the III group element and the nitrogen atom. As a result, many defects are generated so that the semiconductor may not function as a good nitride semiconductor.

When the nitride semiconductor contains two or more kinds of the III group elements, the band gap of the nitride semiconductor can be adjusted into a desired value by changing the blend ratio therebetween. For example, by adding Al to a base composition of GaN and H having a band gap of 3.2 to 3.5 eV (corresponding to a long wavelength absorption edge of about 420 to 300 nm), the band gap can be changed into a band gap of 3.5 to 6.5 eV (corresponding to a long wavelength absorption edge of 300 to 180 nm). By adding Al and In to the base composition, the band gap can be adjusted as well.

The composition of the elements contained in the nitride semiconductor can be measured by such a method as X-ray photoelectron spectrometry (XPS), electron microprobe analysis, Rutherford back scattering (RBS), or secondary ion mass spectrometry.

The semiconductor layer 28 may be made of an oxide semiconductor having a wide band gap, such as titanium oxide or zinc oxide, as well as the above-mentioned nitride semiconductor.

Titanium oxide may be in the form of crystal, microcrystal or polycrystal, and may be of a rutile or anatase type. Zinc oxide may be in the form of crystal, microcrystal or polycrystal.

These oxide semiconductors have a smooth face and are transparent. Titanium oxide and zinc oxide are n-type semiconductors based on an oxygen bond defect resulting from a variation of the concentration of oxygen from the stoichiometric ratio, and a Schottky barrier is formed between the oxide and a transparent conductive electrode. As the ratio of oxygen to titanium or zinc, a value of 0.9 to 12 can be used. The electric conductivity of the oxide semiconductor can be controlled by hydrogen plasma treatment, thermally annealing treatment in a hydrogen atmosphere, or some other treatment after the production of the oxide semiconductor.

The size of the crystals in the oxide semiconductor is preferably from 5 nm to 50 $\mu$m. The size of the crystals can be measured by X-ray diffractometry, electron ray diffractometry, shape analysis using an electron microscopic photograph, or the like.

The oxide semiconductor can be fabricated by vapor deposition, reactive vapor deposition, ion plating, sputtering, reactive sputtering, CVD based on reaction of a metal chloride compound or an organic compound with oxygen, or hydrolysis or thermolysis of a metal alkoxide compound or a metal chelate compound.

Titanium oxide or zinc oxide may be used as the starting material for vapor deposition, reactive vapor deposition, ion plating, sputtering, reactive sputtering, or the like; or titanium or zinc is used as the starting material thereof to form a film in an atmosphere containing oxygen. Titanium and oxygen as starting materials may be caused to react directly with each other.

The oxide semiconductor may be produced by using a gas such as titanium chloride, titanium alkoxide, zinc chloride or zinc alkoxide and causing decomposition reaction thereof in the state that the compound is heated in an oxygen atmosphere or an oxygen plasma.

The transparent substrate 24 may be electrically conductive or insulated, and may be in a crystalline form or an amorphous form. The conductive substrate may be made of a semiconductor such as GaN, SiC, or ZnO.

The transparent substrate 24 may be an insulating substrate the surface of which is subjected to electrically conductive treatment. The insulating substrate may be a film or plate made of a transparent inorganic material such as glass, quartz, sapphire, MgO, LiF or $CaF_2$, or a transparent polymer such as fluorine-containing resin, polyester, polycarbonate, polyethylene, polyethylene terephthalate, or epoxy resin. When ultraviolet rays having wavelengths of 330 nm or less are measured, it is preferable to use quartz, sapphire, MgO, LiF, $CaF_2$ or the like.

Light is radiated onto the light detecting device (or the light receiving element) from the transparent substrate 24 side thereof. To control the spectral sensitivity thereof, the transparent substrate 24 may also function as an optical filter.

The transparent conductive electrode 26 may be an electrode formed by vapor deposition, ion plating, sputtering or some other method using a transparent conductive material such as ITO, zinc oxide, tin oxide, lead oxide, indium oxide or copper iodide, or an electrode formed thinly to such a degree that the electrode is semitransparent by vapor deposition or sputtering of a metal such as Al, Ni or Au.

The electrode 30 may be an electrode formed by vapor deposition, ion plating, sputtering or some other method using a transparent conductive material such as ITO, zinc oxide, tin oxide, lead oxide, indium oxide or copper iodide, or an electrode formed by vapor deposition or sputtering of a metal such as Al, Ni, Au, Ag, Ti or Pt. The electrode 30 may not have light-transmissibility. When a metal is used to form the electrode 30, the electrode 30 acts as a mirror for reflecting light (for example, ultraviolet rays) transmitted through the semiconductor layer 28, so as to increase the sensitivity of the whole of the light detecting device. Thus, this case is preferable.

An adhesive layer 36 may be made of a resin such as acrylic resin, polyester, polyvinyl chloride, polyethylene, polypropylene, polyurethane, epoxy resin or silicone resin. Of these resins, silicone resin is preferable since the UV absorption of the resin is little and the workability and the heat resistance of the resin are good. A modified silicone resin may be used. The adhesive layer 36 may be made from a curable silicone or a room-temperature-curable silicone. For the formation of the adhesive layer 36 made of resin material, various methods as follows can be adopted: spray coating, bar coater printing, screen printing, blade printing, and drop coating.

The electrically conductive member 34 is preferably made from, for example, curable electrically conductive resin from the viewpoints of the adhesive strength, the heat resistance and the environmental stability thereof. As an electrically conductant agent of the curable electrically conductive resin, filler made of metal, carbon or the like can be used. As the resin of the curable electrically conductive resin, any resin that is usually used as adhesive agent material can be used. As the curable electrically conductive resin, an ordinary silver/epoxy type electrically conductive resin in which silver particles are dispersed can be used. As the curable electrically conductive resin, anisotropically conductive material also can be used. Specifically, as this electrically conductive resin, for example, a thermosetting silver paste can be used.

The protective layer 48 may be made of inorganic or organic polymer material, or inorganic insulator thin film material. By providing the protective layer 48, it possible to maintain the mechanical strength and the chemical stability of the light receiving element 20 when the element 20 is worked or mounted. The ultraviolet rays radiated to the light detecting device (light receiving element 20) are absorbed in each of the transparent substrate 24, the transparent conductive electrode 26 and the semiconductor layer 28, and cut by means of the electrode 30. When the radiation is performed for a long time or the radiated ultraviolet rays are intense, the ultraviolet rays go to the rear side of the electrode 30 by the penetration, scattering or diffraction thereof. As a result, the ultraviolet rays are radiated onto this protective layer 48 also. Accordingly, the protective layer 48 is required to be made of a material resistant against ultraviolet rays.

Thus, the constituent material of the protective layer 48 is preferably an inorganic material or a material which does not absorb any ultraviolet ray. The constituent material of the protective layer 48 may be a thin-film form inorganic material such as silicon oxide, silicon nitride, aluminum nitride or gallium nitride, or a UV-absorbent-free resin such as acrylic resin, polyester, polyvinyl chloride, polyethylene, polypropylene, polyurethane, silicone resin. Of these resins, silicone resin is preferable since the UV absorption of the resin is little and the workability and the heat resistance of the resin are good. As the silicone resin, a modified silicone resin may be used. A curable silicone resin is particularly preferable as the constituent material of the protective layer 48 since the resin can make a dense film and the workability and the heat resistance of the resin are good.

When a resin type material is used as the constituent material of the protective layer 48, the protective layer 48 can be formed by various methods such as spray coating, bar coater printing, screen printing, blade printing, and drop coating. When an inorganic material is used as the constituent material of the protective layer 48, the protective layer 48 can be formed by a method such as vapor deposition, sputtering or plasma CVD, or a method of applying a solution and then performing thermolysis, such as a sol-gel method.

The visible light absorbing layer 50 is a layer for removing the reflection of visible light on the insulating substrate 22. This visible light absorbing layer 50 may absorb only visible light or may absorb ultraviolet rays in addition thereto. By providing the visible light absorbing layer 50, it possible to suppress the following: in particular, in measurement for light comprising visible rays at a large ratio, such as sunlight, intense visible rays absorbed slightly in the semiconductor layer 28 and transmitted through the layer 28 are reflected on the insulating substrate 22, and then radiated into the semiconductor layer 28, whereby the sensitivity in the range of the visible rays increases. As a result, more precise measurement can be attained.

The visible light absorbing layer 50 can be formed by printing raw material thereof on the insulating substrate 22 or the protective layer 48. The visible light absorbing layer 50 is particularly desirably black and insulating. The constituent material thereof is preferably silicone resin from the viewpoints of the heat resistance and the chemical stability thereof. Since this visible light absorbing layer 50 is not brought into direct contact with electrodes of the light receiving element 20, the layer 50 produces no effect on the performance of the light detecting device even if the layer 50 is deteriorated by ultraviolet rays.

The visible light absorbing layer 50 may be formed to be adhered closely to the insulating substrate 22 or the protective layer 48 or to be separated therefrom. The case that the layer 50 is adhered closely thereto is preferable since the adhesive strength thereof to the insulating substrate 22 increases.

The light-shielding layer 46 is a layer for preventing light incidence from the end(s) of the transparent substrate 24 to improve the incidence angle characteristic of the light detecting device. This light-shielding layer 46 can be formed made, for example, a black paint.

The light detecting device can use light incidence from the end(s) of the transparent substrate without forming this light-shielding layer 46. In this case, light may be radiated into the device along an oblique direction, or along a horizontal direction.

EXAMPLES

The present invention is specifically described by way of the following examples. However, the invention is not limited by these examples.

Figure 8:
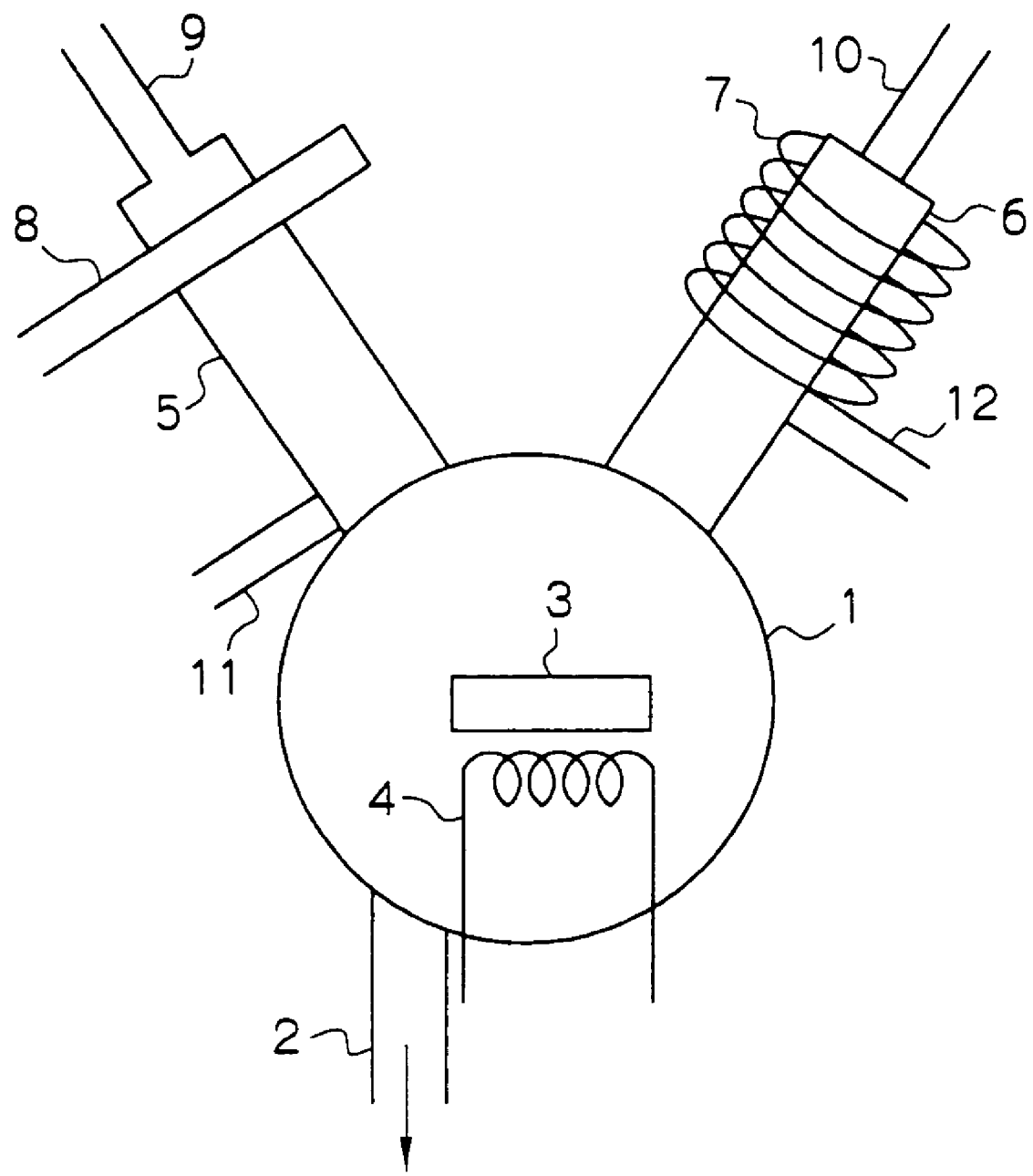
FIG. 8 is a schematic view illustrating a film-forming apparatus used in the fabrication of a nitride semiconductor.

In order to form a semiconductor layer of the present examples, a film-forming apparatus illustrated in FIG. 8 are used. In the film-forming apparatus illustrated in FIG. 8, reference numeral 1 represents a vacuum container; reference numeral 2 represents an air outlet; reference numeral 3 represents a substrate holder; reference numeral 4 represents a heater for heating a substrate; and reference numerals 5 and 6 represent quartz pipes connected to the container 1. The pipes 5 and 6 are connected to gas introducing pipes 9 and 10, respectively. A gas introducing pipe 11 is also connected to the quartz pipe 5, and a gas introducing pipe 12 is also connected to the quartz pipe 6. In this film-forming apparatus, for example, $N_2$ is used as a nitrogen element source to be introduced through the gas introducing pipe 9 to the quartz pipe 5. Microwaves are supplied to a microwave guide 8 connected to a microwave oscillator (not illustrated) using a magnetron, so as to generate electric discharge in the quartz pipe 5. For example, $H_2$ is introduced through the gas introducing pipe 10 different therefrom to the quartz pipe 6. High-frequency waves are supplied from a high-frequency oscillator (not illustrated) to a high-frequency coil 7, so as to generate electric discharge in the quartz pipe 6. For example, trimethylgallium is introduced from the downstream side of the discharge space through the gas introducing pipe 12, whereby a nitride semiconductor film can be formed on the substrate.

EXAMPLE 1

A substrate in which a metal mask is used to sputter indium tin oxide (ITO) into a thickness of 1000 Å onto a cleaned 0.5 mm thickness borosilicate glass substrate (1.2× 1.8 mm) [a transparent substrate 24 in which a transparent conductive electrode 26 is formed] is first put onto the substrate holder 3 set inside the vacuum container, and then the substrate is heated to 400° C. with the heater 4 after the container 1 is evacuated through the air outlet 2. $N_2$ gas introduced at 2000 sccm through the gas introducing pipe 9 into the quartz pipe 5 having a diameter of 25 mm and 2.45 GHz microwaves set into an output of 250 W are supplied through the microwave guide 8 so as to be tuned for matching with a tuner. In this way, electric discharge is caused. At this time, the output of reflected waves is 0 W. $H_2$ gas is introduced at 500 sccm through the gas introducing pipe 10 into the quartz pipe 6 having a diameter of 30 mm. The output of 13.56 MHz high-frequency waves is set into 100 W. The output of reflected waves is 0 W. In this state, hydrogen is used as a carrier gas to introduce vapor of trimethylgallium (TMGa), kept at 0° C., at 0.2 sccm through the gas introducing pipe 12 via a mass flow controller while bubbling is performed at a pressure of 106 Pa. $H_2$ gas is introduced to cyclopentadienyl magnesium, kept at 20° C., at a pressure of 65000 Pa through the gas introducing pipe 12. The $H_2$ gas is introduced at 1 sccm to the area for reaction via a mass flow controller. At this time, the reaction pressure measured with a Baratron vacuum gauge is 6.7 Pa. Film-formation is continued for 120 minutes to form a 0.1 μm thickness GaN:H film doped with Mg [a semiconductor film 28].

An Au electrode (light receiving electrode and a terminal portion) [an electrode 30] of 1×1 mm size is formed into a thickness of 50 nm on the above-mentioned film by vacuum evaporation. In this way, a light receiving element (a light receiving element 20) is formed.

A silicone resin (silicone varnish KR-2038, manufactured by Shin-Etsu Chemical Co., Ltd.) is applied into a thickness of about 20 μm onto the light receiving element surface opposite to the insulating substrate, so as not to cover the respective electrodes of the light receiving element. Thereafter, the resin is cured at 160° C. for 30 minutes to produce a light receiving element having a protective layer 48.

Next, the following is prepared: an insulating substrate in which Au terminal electrode wiring lines are formed on the front surface, an end face and the middle of the rear surface of a ceramic substrate of 1.5×2.5 mm size [an insulating substrate 22 on which terminal electrodes 32 are formed]. The terminal electrode wiring lies are formed on two areas of the substrate. The width of each of the wiring lines is 0.5 mm.

A thermosetting electrically conductive paste (an electrically conductive member 34) is dropped onto the terminal electrodes exposed to the front surface of the insulating substrate. While the positioning of the light receiving element is performed, the light receiving element is put onto the insulating substrate to connect the terminal electrodes of the insulating substrate electrically to the respective electrodes of the light receiving element through the electrically conductive paste and further bond and fix the light receiving element onto the insulating substrate. The curing temperature and the curing time of the thermosetting electrically conductive paste are 160° C. and 30 minutes, respectively. In this way, a plane-form light detecting device capable of being surface-mounted is produced. The thickness thereof is 1 mm. This light detecting device has photosensitivity to wavelengths of 280 to 410 nm (the photosensitive range is a range having wavelengths at which a sensitivity of 5% of the maximum peak is exhibited).

The terminal electrodes exposed to the end faces of the insulating substrate are mounted on creamy solder printed on an electric circuit board so as to position the produced light detecting device. The resultant is subjected to heat treatment at 250° C. for 30 seconds. As a result, the light detecting device is permitted to be surface-mounted onto the circuit board.

Even when the produced light detecting device is exposed to an atmosphere of 300° C. temperature for 10 minutes, the spectral sensitivity and the dark current thereof are not changed. Thus, the light detecting device is excellent in heat resistance and endurance.

EXAMPLE 2

A black silicone resin (silicone adhesive KE 1831, manufactured by Shin-Etsu Chemical Co., Ltd.) is applied into a thickness of 10 μm onto a protective layer formed on a light receiving element, and further a thermosetting electrically conductive paste (an electrically conductive member 34) is dropped onto the respective electrodes (electrode portions for connection) of the light receiving element. While the positioning of the light receiving element is performed, the light receiving element is put onto the insulating substrate. The resultant is treated at 160° C. for 30 minutes to connect the terminal electrodes of the insulating substrate electrically to the respective electrodes of the light receiving element through the electrically conductive paste and further bond and fix the light receiving element onto the insulating substrate. Furthermore, a visible light absorbing layer 50 adhered closely to the protective layer is formed. In the same manner as in Example 1 except the step described above, a light detecting device is produced. The spectral sensitivity of this light detecting device is measured. As a result, the sensitivity thereof to wavelengths of 280 to 410 nm is not different from that of Example 1. However, it is understood that the photosensitivity thereof is 2 to 5 times higher than that of Example 1 in the range of wavelengths longer than 410 nm.

The terminal electrodes exposed to the end faces of the insulating substrate are mounted on creamy solder printed on an electric circuit board so as to position the produced light detecting device. The resultant is subjected to heat treatment at 250° C. for 30 seconds. As a result, the light detecting device is permitted to be surface-mounted onto the circuit board.

Even when the produced light detecting device is exposed to an atmosphere of 300° C. temperature for 10 minutes, the spectral sensitivity and the dark current thereof are not changed. Thus, the light detecting device is excellent in heat resistance and endurance.

EXAMPLE 3

The same silicone resin as in Example 1 is screen-printed on a light receiving element to form a protective layer of 10 μm thickness. Furthermore, the same silicone resin as in Example 2 is screen-printed on an insulating substrate to form a black visible light absorbing layer. In the same way as in Example 2 except that these are used, a light detecting device in which the protective layer is adhered closely to the visible light absorbing layer is produced. The spectral sensitivity of this light detecting device is not different from that of Example 2 in the ultraviolet ray range or the visible light range.

The terminal electrodes exposed to the end faces of the insulating substrate are mounted on creamy solder printed on an electric circuit board so as to position the produced light detecting device. The resultant is subjected to heat treatment at 250° C. for 30 seconds. As a result, the light detecting device is permitted to be surface-mounted onto the circuit board.

Even when the produced light detecting device is exposed to an atmosphere of 300° C. temperature for 10 minutes, the spectral sensitivity and the dark current thereof are not changed. Thus, the light detecting device is excellent in heat resistance and endurance.

The oblique incidence characteristic of the produced light detecting device is measured at incidence angles of +80 to −80°. As a result, it is understood that the characteristic value is largely shifted from the cosine law at incidence angles of +30 to −30°. In short, it is understood that a large effect of the end face incidence is produced.

EXAMPLE 4

The light detecting device produced in Example 3 is used, and a black paint is applied onto the end faces of the glass substrate (the transparent substrate 24) to form a light-shielding layer (a light-shielding layer 46). The oblique incidence characteristic thereof is measured. The oblique incidence characteristic of this detecting device is measured at incidence angles of +80 to −80°. As a result, it is understood that the characteristic is substantially in conformity with the cosine law at incidence angles of +60 to −60°.

EXAMPLE 5

In the same way as in Example 1, a semiconductor layer doped with In is formed and a light receiving element caused to have blue sensitivity is produced. In the same way as in Example 3 except this, a light detecting device is produced. The spectral sensitivity of this light detecting device is measured. As a result, the light detecting device has sensitivity to wavelengths of 280 to 500 nm.

What is claimed is:

1. A light detecting device, comprising:
    a light receiving element comprising a semiconductor layer for detecting light, a first electrode connected electrically to the semiconductor layer, and a transparent substrate on which the semiconductor layer and the first electrode are provided;
    an insulating substrate on which the light receiving element is arranged;
    a second electrode provided so as to be exposed at a first face and a second face of the insulating substrate;
    a protective layer provided between the light receiving element and the insulating substrate: and
    a light shielding layer on an end face of the transparent substrate,
    wherein the light receiving element is arranged on the first face of the insulating substrate, and the first electrode is electrically connected to the second electrode which is exposed at the first face of the insulating substrate.

2. A light detecting device according to claim 1, wherein each of the first electrode and the second electrode comprises at least one pair of electrodes.

3. A light detecting device according to claim 1, wherein the second electrode is a metallic electrode.

4. A light detecting device according to claim 1, wherein the insulating substrate absorbs visible light.

5. A light detecting device according to claim 1, wherein the semiconductor layer of the light receiving element includes a nitride comprising nitrogen and at least one selected from Al, Ga and In.

6. A light detecting device according to claim 1, wherein the protective layer can transmit visible light.

7. A light detecting device according to claim 1, wherein the protective layer comprises a silicone resin.

8. A light detecting device according to claim 1, which further comprises a visible light absorbing layer provided between the light receiving element and the insulating substrate.

9. A light detecting device according to claim 8, wherein the visible light absorbing layer comprises a silicone resin.

10. A light detecting device according to claim 1, wherein the first electrode of the light receiving element and the second electrode of the insulating substrate are electrically connected to each other and bonded to each other, through an electrically conductive member at a position different from that of a light receiving portion of the light receiving element, thereby fixing the light receiving element onto the insulating substrate.

11. A light detecting device according to claim 10, wherein the electrically conductive member is made of an electrically conductive resin.

12. A light detecting device according to claim 1, wherein the second electrode is provided so as to be exposed at a front face and a rear face of the insulating substrate, the light receiving element is arranged on the front face of the insulating substrate, and the first electrode is electrically connected to the second electrode which is exposed at the front face of the insulating substrate.

13. A method for surface-mounting a light detecting device on a circuit board, the light detecting device comprising:
a light receiving element comprising a semiconductor layer for detecting light, a first electrode connected electrically to the semiconductor layer, and a transparent substrate on which the semiconductor layer and the first electrode are provided;
an insulating substrate on which the light receiving element is arranged;
a second electrode provided so as to be exposed at a first face and a second face of the insulating substrate;
a protective layer provided between the light receiving element and the insulating substrate; and
a light shielding layer on an end face of the transparent substrate,
wherein the light receiving element is arranged on the first face of the insulating substrate, the first electrode is electrically connected to the second electrode which is exposed at the first face of the insulating substrate, and the light detecting device is surface-mounted on the circuit board in such a manner that the second electrode exposed at the second face of the insulating substrate is connected to an external terminal of the circuit board.

14. A surface-mounting method according to claim 13, wherein each of the first electrode and the second electrode comprises at least one pair of electrodes.

15. A surface-mounting method according to claim 13, wherein the second electrode is a metallic electrode.

16. A surface-mounting method according to claim 13, wherein the insulating substrate absorbs visible light.

17. A surface-mounting method according to claim 13, wherein the semiconductor layer of the light receiving element includes a nitride comprising nitrogen and at least one selected from Al, Ga and In.

18. A surface-mounting method according to claim 13, wherein the protective layer can transmit visible light.

19. A surface-mounting method according to claim 13, wherein the protective layer comprises a silicone resin.

20. A surface-mounting method according to claim 13, which further comprises providing a visible light absorbing layer between the light receiving element and the insulating substrate.

21. A surface-mounting method according to claim 20, wherein the visible light absorbing layer comprises a silicon resin.

22. A surface-mounting method according to claim 13, which further comprises electrically connecting the first electrode of the light receiving element and the second electrode of the insulating substrate to each other and bonding the electrodes to each other, through an electrically conductive member at a position different from that of a light receiving portion of the light receiving element, to thereby fix the light receiving element onto the insulating substrate.

23. A surface-mounting method according to claim 22, wherein the electrically conductive member comprises an electrically conductive resin.

24. A surface-mounting method according to claim 13, which further comprises providing the second electrode so as to be exposed at a front face and a rear face of the insulating substrate, arranging the light receiving element on the front face of the insulating substrate, and electrically connecting the first electrode to the second electrode which is exposed at the front face of the insulating substrate.

* * * * *